Paul L. Farren
INVENTOR.

BY Robert W B Dulmen

ATTORNEY

Fig. 8

Paul L. Farren
INVENTOR.

BY

ATTORNEY

Paul L. Farren
INVENTOR.

Paul L. Farren
INVENTOR.

BY
ATTORNEY

Fig. 22

Paul L. Farren
INVENTOR.

United States Patent Office 3,424,316
Patented Jan. 28, 1969

3,424,316
STORAGE CONTAINER
Paul L. Farren, 5603 S. Rice Ave.,
Houston, Tex. 77036
Application Mar. 23, 1966, Ser. No. 536,760, which is a continuation of application Ser. No. 526,262, Feb. 9, 1966. Divided and this application Aug. 30, 1967, Ser. No. 664,323
U.S. Cl. 211—148                                6 Claims
Int. Cl. A47b *43/00, 63/06, 57/28*

ABSTRACT OF THE DISCLOSURE

Tray and tray support for tape reels, the tray support so supporting the tray that the reels riding therein are biased toward one tray end. A tray portion may fit within a channel-shaped member of the support. The tray may include vertical partitions and reel-limiting devices extending outward of the partitions so as to restrain the tape reels.

---

This invention concerns a device for storing data, and is a division of application 536,760, filed Mar. 23, 1966, which application was a continuation of application No. 526,262, filed Feb. 9, 1966, now abandoned.

More particularly this application concerns a tiltable storage shelf on which containers, data or compilations of data may be stored in such a manner as to greatly reduce the floor space ordinarily consumed, and a device for storing records in a manner whereby the entire device and data that may be contained therein may be expeditiously assembled, transported and stacked or stored in a manner providing extreme ease of access.

Inasmuch as modern industry gathers, requires and utilizes tremendous quantities of information, the pure volume of compiled data is daily increasing in amounts unheard of twenty years ago. This data is stored in many forms, such as in volumes, notebooks, tape rolls, microfilm, etc. These in turn, may be placed in drawers, on shelves, or in libraries. Such a constantly increasing volume of information, information which must be retrievable, requires an ever increasing amount of space for storage. Standard practice includes the stacking of drawer upon drawer of documents, as in the Patent Office, or the common back-to-back placement common in most libraries. Such arrangements therefore require aisle space between each upright storage structure, shelf or container and such structure, rack or container normally must be erected in advance to prepare for storage of the container. Additionally the home consumption of entertainment devices such as recordings on tape constitutes a greatly expanding market.

This invention contemplates the storage of a plurality of containers on each shelf in a manner wherein on removing the nearest container, the immediately rearwardly adjacent one may automatically assume an available position. Such an action is permitted by having the rear of the individual shelf elevated relative to the front. Further, the invention contemplates the transportability of entire groups of shelves so as to further conserve aisle space. Although the invention will be described in terms of the storage of tape rolls or spools, it should be realized that this example is used for ease of presentation rather than as a limitation.

An embodiment of the invention is designed to present an individually contained storage unit or cell or module which utilizes the tiltable feature of the invention, but, additionally permits such units to be stacked atop others so as to permit building a storage structure as needed and desired. Such embodiment additionally permits economies in manufacture, assembly, transportation and utilization. Materials can be boxed upon manufacture and indexed and identified by the manufacturer for final use so that the usual intermediate operation by the user of identifying the materials and erecting structure to house them may be eliminated.

Thus, this inventioin has as its object the storage of a high volume of information within a more limited space than heretofore possible.

A further object is the storage of a plurality of individual containers on a single shelf.

Yet another object is the conservation of unnecessary aisle space in an area where information-containers are stored.

A still further object is the rendering of mobility to individual shelves or racks.

Another object is the provision of a storage and/or shipping unit which may be individually transported and used or stacked atop similar units.

A further object is permitting the manufacture of a container that in itself is a module of a self erecting library.

These and other objects and uses will become obvious on considering the following appended description and drawings in which:

Figure 1:
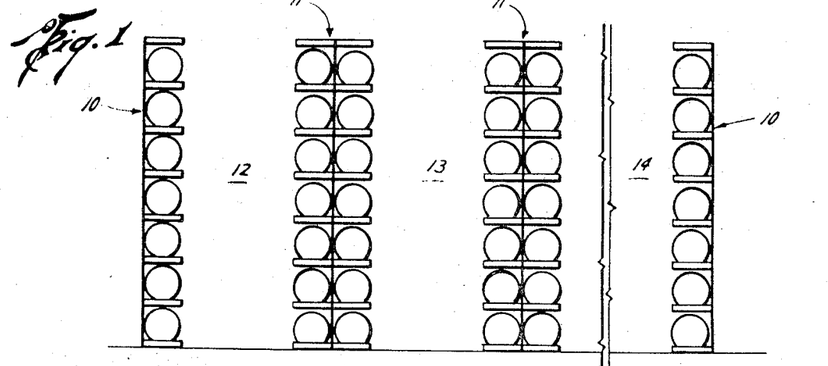
FIGURE 1 is a schematic representation of a conventional storage arrangement.
Figure 2:
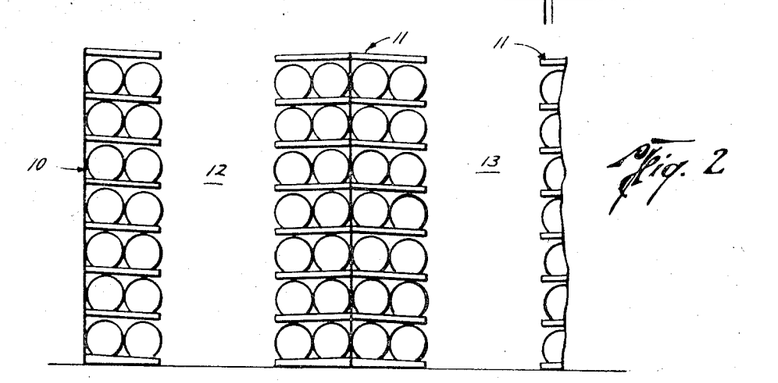
FIGURE 2 is a schematic representation using the tiltable shelf of this invention.
Figure 3:
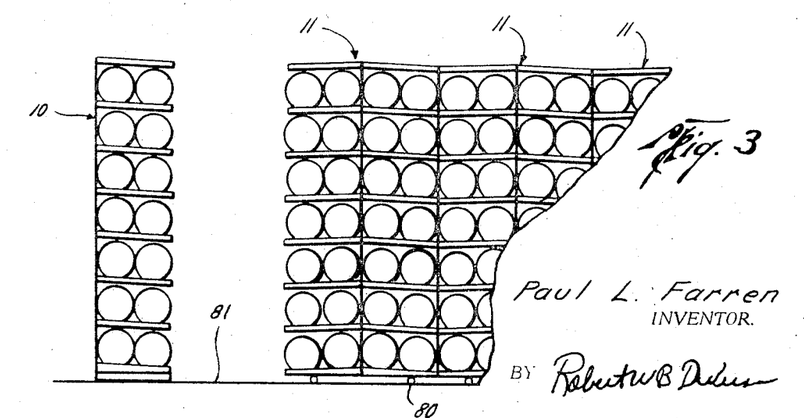
FIGURE 3 is a schematic representation of the tiltable shelf concept of this invention as well as the mobility concept.

The representations of FIGURES 1, 2 and 3 should first be examined in order to understand the problem of, and the savings resulting from solving said problem of excessive aisle space. FIGURE 1 depicts a conventional manner of storing data including vertical stacks or arrangement of wall shelves 10, separated by individual intermediate vertical stacks 11, each stack being separated by an aisle, denominated 12, 13 and 14 respectively. By virtue of the aisle space, the retriever may have access to data stored in the wall stack or on one face of the adjacent intermediate stack. Moving now to FIGURE 2, the wall stack 10 is seen to utilize the tiltable concept, hereinafter described to increase the amount of material available on the wall. Further, each intermediate rack 11 utilizes the tilt concept so as to increase the quantity of information stored intermediate aisles such as 12 and 13. On utilizing standard 36 inch aisles between adjacent vertical racks, the arrangement of FIGURE 2 would permit 20 vertical columns of tape to be stored in the same space in which the arrangement of FIGURE 1 would permit only 14 vertical columns, an increase of approximately 43%. Moving onto FIGURE 3 where the intermediate stacks 11 are mounted on rollers which ride on rails, the wall stacks 10 may or may not be fixed. Here one aisle parallel to a row of shelves may suffice for an entire room, along with a perpendicular access aisle, i.e., the intermediate stacks may be moved so as to gain access to the particularly desired information. Such an arrangement could permit the storage of 32 vertical columns of tape within the same area in which the arrangement of FIGURE 1 would only permit 14 columns, an increase of almost 130%.

Figure 8:
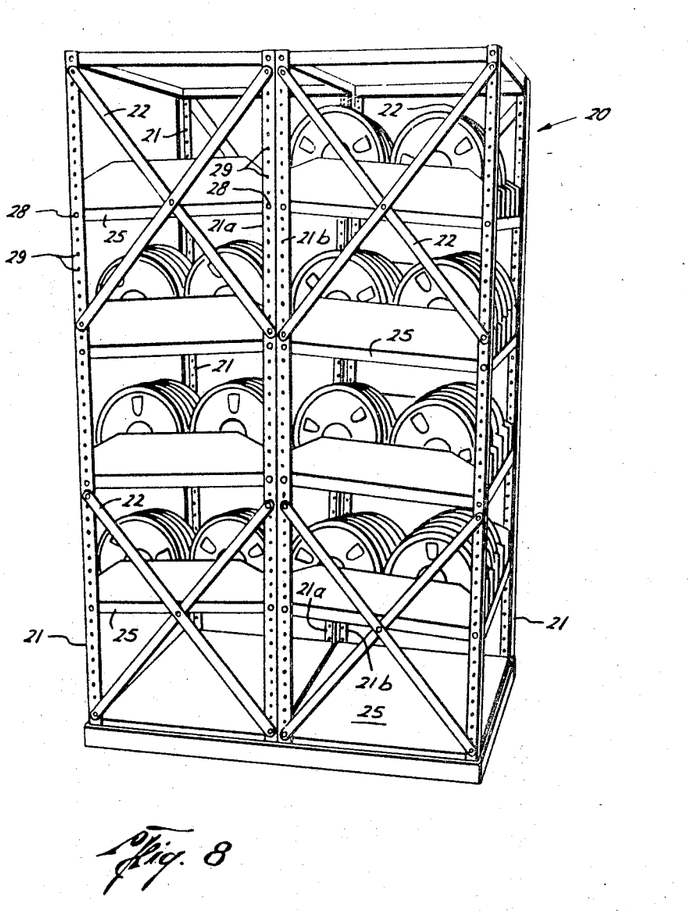
FIGURE 8 is a perspective depicting a fully assembled rack utilizing the tiltable tray.

Consider now the perspective of FIGURE 8 which depicts a single vertically arranged storage stack 20. With the exception of the tiltable and mobility features, such stacks may be almost universally procured. Such a stack may include angled corner frame members 21, secured together by reinforcing members 22. Shelves 25 are affixed to said corner pieces on either side of the center line of the stack, which center line may be defined by the juncture of center corner members 21a—21a and 21b—21b. Standard shelving oftentimes has a tray-like configuration, i.e., one surface may be flat, usually the upper, with the lower surface dished or concave, resulting from 90° flanges associated with the rectangle sides. The lowermost shelf of FIGURE 8 is shown in the normally used position, flat side up, while the higher shelves are reversed with the flat side down, for a purpose hereinafter described.

Shelves 25 are seen to be attached to center corner members 21a, 21b by means such as pins, weld or brackets 28 which may pass through one of a series of spaced perforations 29 standardly provided in the angled frame members. This permits the shelves to be positioned as desired. The front portion of the shelves, or that side outwardly of the center of the stack, is connected by pins, weld, brackets, or similar fasteners 28, passing through perforations 29 in frame members 21. Said front portion is connected to said frame members in such a manner or at such a position so that the shelves are tilted downwardly from rear to front. This accounts for the more or less bat-winged appearance of the shelves as viewed in FIGURE 8. The lowermost shelf 25 may be so positioned as to be flat, as shown in FIGURE 8, or may be tilted as are the upper shelves.

Consider now the individual shelf components as shown in FIGURES 4, 5, 6 and 7. The shelves 25, with the exception possibly of the lowermost one in the rack as previously mentioned, are inverted so that the flat surface 30 is lowermost with sides 31, 32 extending upwardly therefrom as well as are front and rear ends 33, 34 respectively, presenting a trayed or dished appearance. Adapters or indexing members 40 and 41 are positioned in the front and rear, respectively of the tray-like shelf. Said adapters may be triangularly configured, as in FIGURES 4 and 5, and have a series of horizontally spaced slots 45 on face 44 thereof. Said slots accommodate dividers 50 whose lowermost corners 51 may be inserted in said slots. After such insertion of said dividers, a plurality of compartments are formed whereby rolls, spools of magnetic tape, for example, such as spools 60 may be inserted therein. Obviously a plurality of compartments may be formed in each shelf by varying the position and number of dividers utilized in conjunction with slots 45 in adapters 40. As has previously been noted with respect to FIGURE 8, the front end of the shelves are normally tilted downwardly, as for example by the angle α shown in FIGURE 5. Thus on removing magnetic tape spool 60a, the rearward spool 60 would, by gravity move or roll forward to occupy that position previously occupied by spool 60a.

Figure 7:
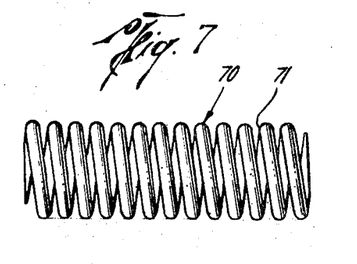
FIGURE 7 is an elevation of a second embodiment of the adapter.

A further and extremely useful embodiment of adapter 40 is shown in FIGURE 7, and is essentially a coiled spring 70 having spaces 71 intermediate adjacent portions or turns of the coil. On utilizing such an embodiment, a coil 70 might be placed in the front and rear of shelf 25 in the position of and in place of adapters 40, 41. The dividers 50, then would have their ends inserted within said spaces 71 rather than in slots 45 of adapters 40. Such an embodiment, while permitting the same operation as in FIGURE 4, permits substantial savings in cost as well as provides ease of installation and provides a large number of potential positions for the dividers, thereby permitting easy variation of the width of the compartments so as to accommodate differently sized spools or rolls.

Figure 4:
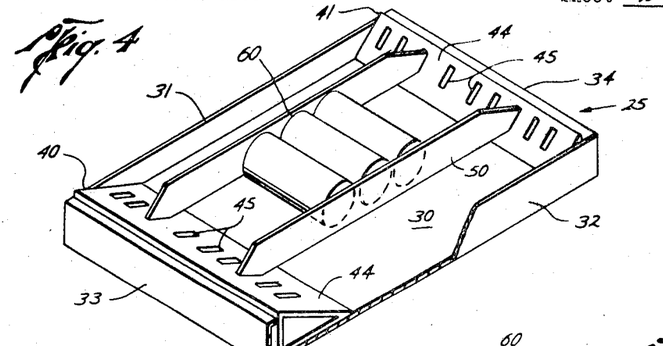
FIGURE 4 is a partly broken away perspective of an individual tray.
Figure 5:
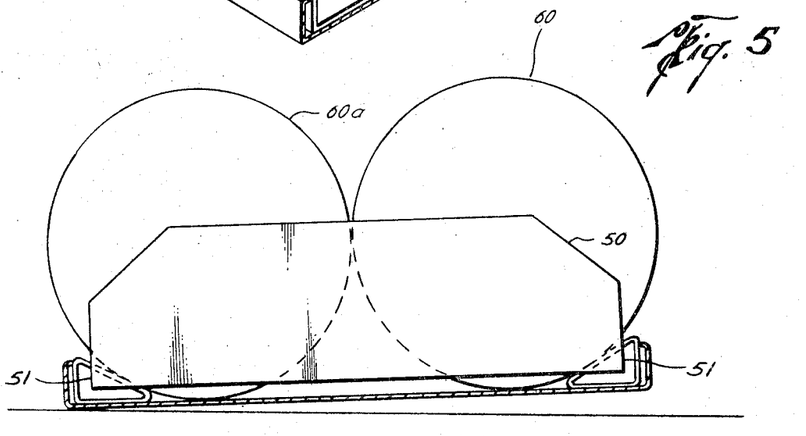
FIGURE 5 is a section through the tray of FIGURE 4.
Figure 6:
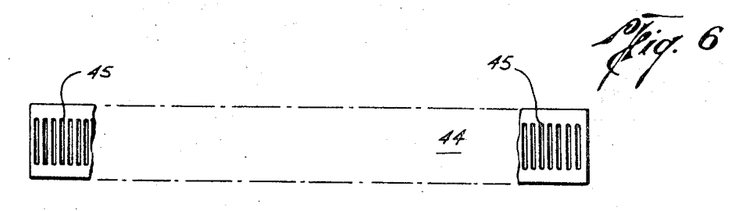
FIGURE 6 is an elevation of one embodiment of an adapter used in this invention.
Figures 9, 10, 11:
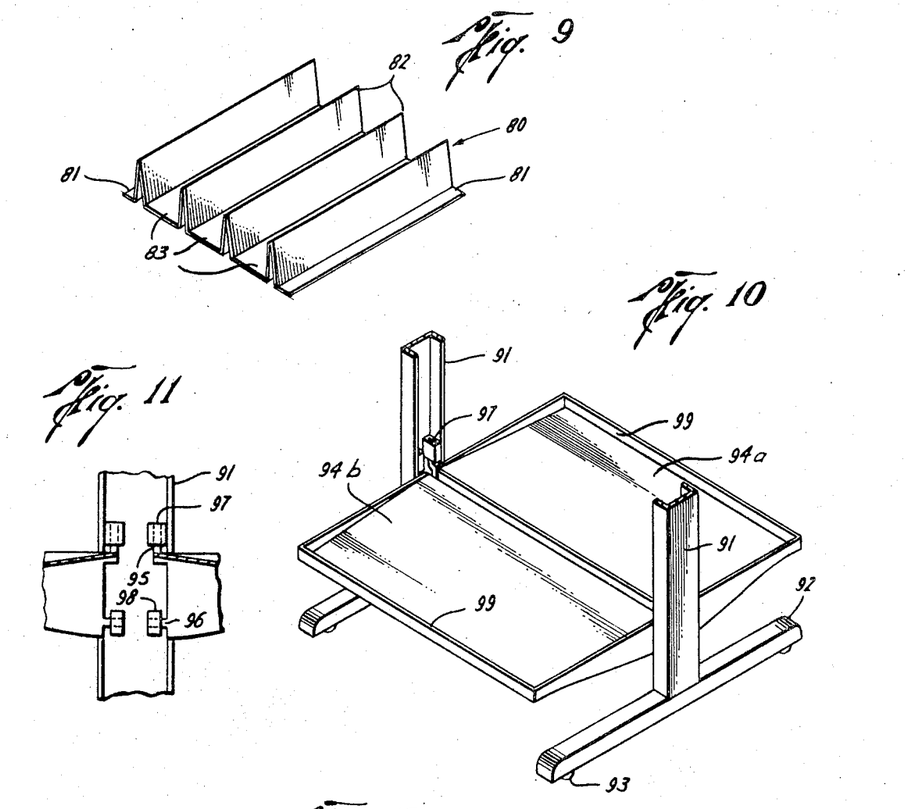
FIGURE 9 is a broken perspective of a modified tray insert.
FIGURE 10 is a perspective of a modified support stand and tray.
FIGURE 11 is a broken elevation of the juncture of the support and tray of FIGURE 10.

In place of adapters 40, springs 70 and dividers 50, the embodiment of FIGURE 9 may be inserted within tray 25 shown in FIGURE 4. Insert 80 would have its lower surface 81 dimensioned as to approximate tray 25, so that said insert could be placed therein. Said insert could be of any suitable material such as plastic or paper, but preferably of thin sheet metal crimped so as to form spaced and aligned peaks or vertical extensions 82. Thus individual compartments 83 would be formed intermediate adjacent walls of extensions 82, said compartments forming runways for tape stored therein. It obviously would be possible for surface 30 of tray 25 to be configured as in FIGURE 9 so that peaks 82 act as dividers. Further, when vertically spaced shelves are used, the lowermost tray surface 30 may be crimped as described above, and the higher trays may be so crimped, and additionally, an insert such as 80 may be affixed to the bottom of surface 30, in an inverted manner, to strengthen the tray and therefore upper and lower guides or dividers would be provided each group of reels.

When it is desirable to store a very large volume of data in a small area, each rack may be outfitted with wheels, rollers, skids or the like 80 (see FIGURE 3) to run direct on the floor or on tracks 81, which would be installed within or on the flooring of a room, library or the like. Thus, one aisle might suffice, in place of a larger number, in that an entire bank of racks might be rolled to a position whereby access may be gained to the desired rack or row of racks.

Figure 12:
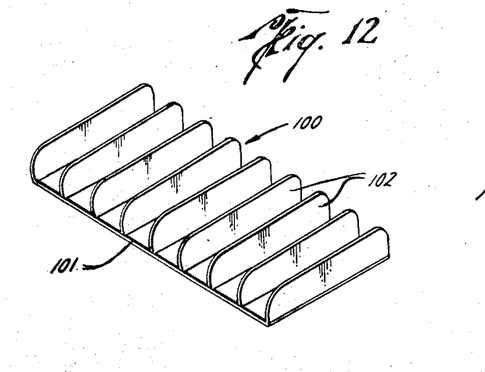
FIGURE 12 is a perspective of a modified tray insert.

A modification of the general supporting structure of FIGURE 8 is shown by FIGURES 10, 11, and 12. This latter embodiment includes upright supporting structure, cantilevered shelves or shelf framework, the latter framework permitting shelves to be adjustably positioned thereon. Considering first FIGURE 10, spaced upright posts 91 each are mounted on support or cross frames 92 which supports 92 may in turn be mounted on rollers 93. Connecting said upright posts are a plurality of vertically spaced, aligned pairs of shelves 94a and 94b. Such shelves, virtually adjustable as height of stored materials dictate, are cantilevered in that, as is more clearly shown by FIGURE 11, one end of the shelves are supported by posts 91. Adjacent faces of shelves 94a, 94b, for example, would have ears such as 95, 96 which would in turn fit within and be positioned by brackets 97, 98 fixed to the surface of posts 91. Obviously other equivalent means for linking the shelves to the support posts 91, such as bolts, welds, tongue in slot, would be acceptable. Each shelf might have raised lip 99 to limit downward motion of any material stored thereon.

Removably positionable divider means 100 are shown in FIGURE 12, and would be positioned atop the shelves of FIGURE 10, such as 94a and 94b or in equivalent support frames to form a plurality of compartments adapted to have compillations of data, such as rolls, stored therein. Said divider means would include a bottom 101 and spaced upstanding walls 102. These walls may either be fixed, or movably positioned relative to bottom 101. It should be obvious that upstanding walls similar to 102 could be provided to shelves 99 of FIGURE 10 if desired, especially if the entire shelf were molded plastic.

Figures 13, 13A:
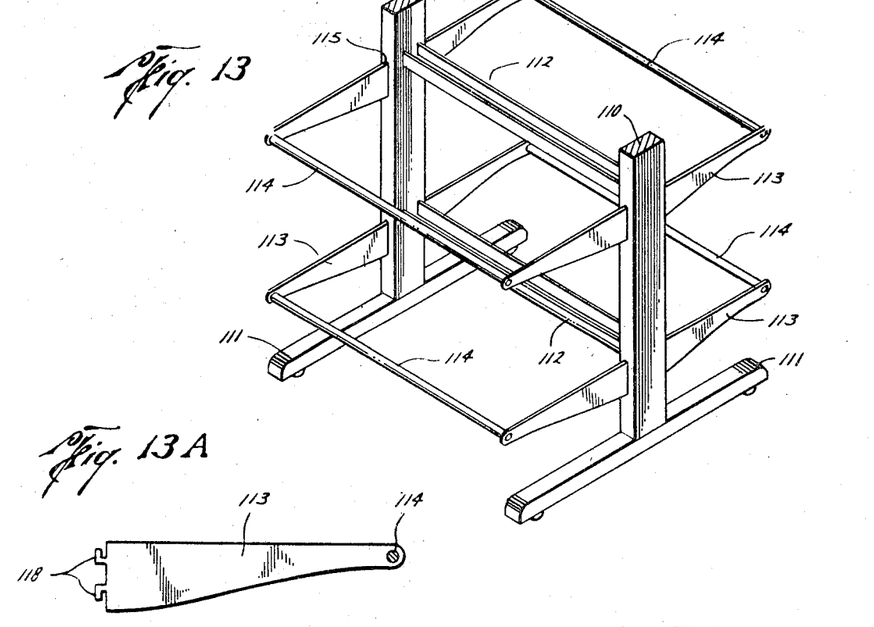
FIGURE 13 is a perspective of a further modified support structure.
FIGURE 13a is an elevation of the side members of FIGURE 13.
Figures 14, 15:
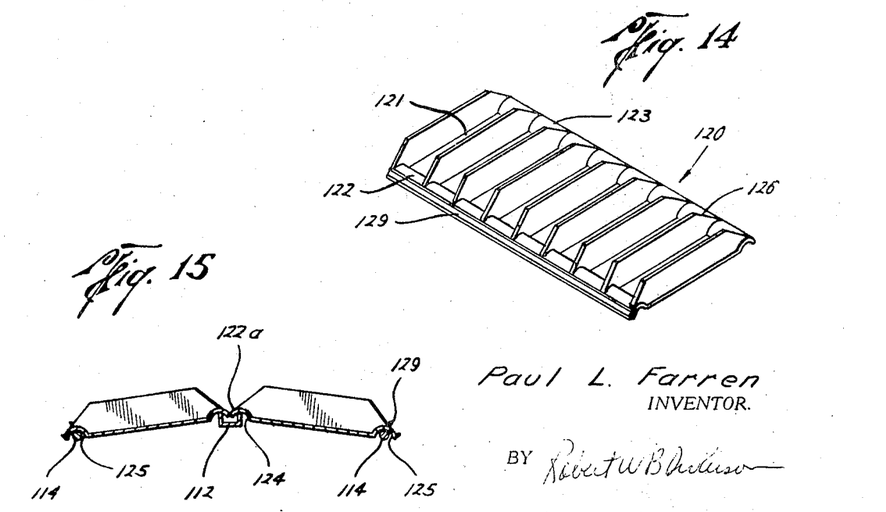
FIGURE 14 is a perspective of the shelf adapted to be used with the support of FIGURE 13.
FIGURE 15 is an elevation, partly in section, of the tray of FIGURE 14 positioned on the support of FIGURE 13.

A further modification, similar to FIGURES 10, 11 and 12 is shown by FIGURES 13, 13a, 14 and 15. FIGURE 13 shows upright supports 110 are connected at their lower end to support beams 111. Linking said members 110 are a plurality of U-shaped bracket members 112, said brackets not only serving as reinforcement or support means but also as shelf receiving means as hereinafter described. Vertically spaced along opposite surface or vertical supports 110, are shelf supporting members which include side walls 113, connected by rods 114, said rods being generally horizontally disposed, and preferably made of steel tubing, pipe or rod-like material. Said side wall members 113 may have, opposite rods 114, lugs 118 for insertion within mating slots (not shown) provided supports 110, much in the manner of standard bed frame and head board linkages. For economy purposes, oppositely disposed shelf supporting members may be linked together to form a bat winged rectangle, the mid point of said rectangle may then be directly affixed to said supports 110, rather than each individual segment being attached to said supports 110, as indicated at 115, 116, any conventional manner of linkage being satisfactory. Tray means 120 are illustrated by FIGURE 15, and include non-planar bottom 121, which may be of molded or extruded plastic, steel or other suitable product. At either side of said bottom are ridges 122, 123 which form on the undersurface of said bottom, cutouts 124, 125. The oppositely directed outer surfaces of ridges 122, 123 may include tab holders 129 for insertion therein of appropriate tags or the like for indexing the contents of the tray. Dividing said bottom into a plurality of parallel channels are spaced dividers 126, said dividers may be fixedly or variably positioned relative to said bottom. Said trays 120 may then be positioned on the superstructure, as shown in FIGURE 14 placing cutout 125 astride rod 114, and cutout 124 astride upright arm 112a of bracket 112 with lip 122a resting within the channel created by said bracket 112. Oppositely disposed trays may be positioned on said superstructure as shown. It should be noted that by virtue of placing bracket 112 higher relative to rod 114, bottom 121 of shelf 120 is tilted downwardly, outwardly of its juncture with said bracket 112. The same effect could be created and remain within the scope of the invention by having members 112 and 114 horizontally aligned, but merely sloping bottom 121 downwardly from ridge 123 to ridge 124. Said ridges obviously serve as barrier or positioning means in that tape rolls, for example, would not roll off the side of tray 120, even though the tray is tilted. It should also be noted that the tray is so designed as to be reversible.

With respect to the tray portions, especially that depicted in FIGURE 12, it may be desirable to include means to limit forward motion of one or more reels of tape carried thereby. For example if reels are carried two or more deep, it may be desirable to, on removing the foremost reel, have a rearwardly positioned reel roll forward enough to enable the user to grasp it, yet remain sufficiently rearward so that a user can tell at a glance that one reel has been taken from its slot. For example, tray 130 of FIGURE 16 includes bottom 131 having front and rear edges 132, 133, respectively, and a plurality of dividers 134 spaced along its length. Positioned on either face of dividers 134, are spring or detent means 135, except that the dividers at the extreme end of bottom 131 need only have said spring means on their inner face. These springs 135 should be located rearwardly of front edge 132 a sufficient distance so that on removing the front reel stored intermediate dividers 134, such as reel 136, the rearwardly adjacent reel will be limited in its forwardly motion by spring means 135, to the position illustrated by reel 137. The actual structure of member 135 could be a leaf of steel or other suitable material such as rubber, which would be affixed, as by welding or otherwise fastening at one end 135a to one face of divider 134. The other end would be free, thus permitting the leaf to normally bow outward so that on removing the pressure exerted by reel 136, said leaf would assume its outwardly expanded position and tend to restrict forwardly motion of an adjacent reel. Thus an observer could quickly tell from what position a reel had been removed.

Figures 16, 17, 18, 19, 20:
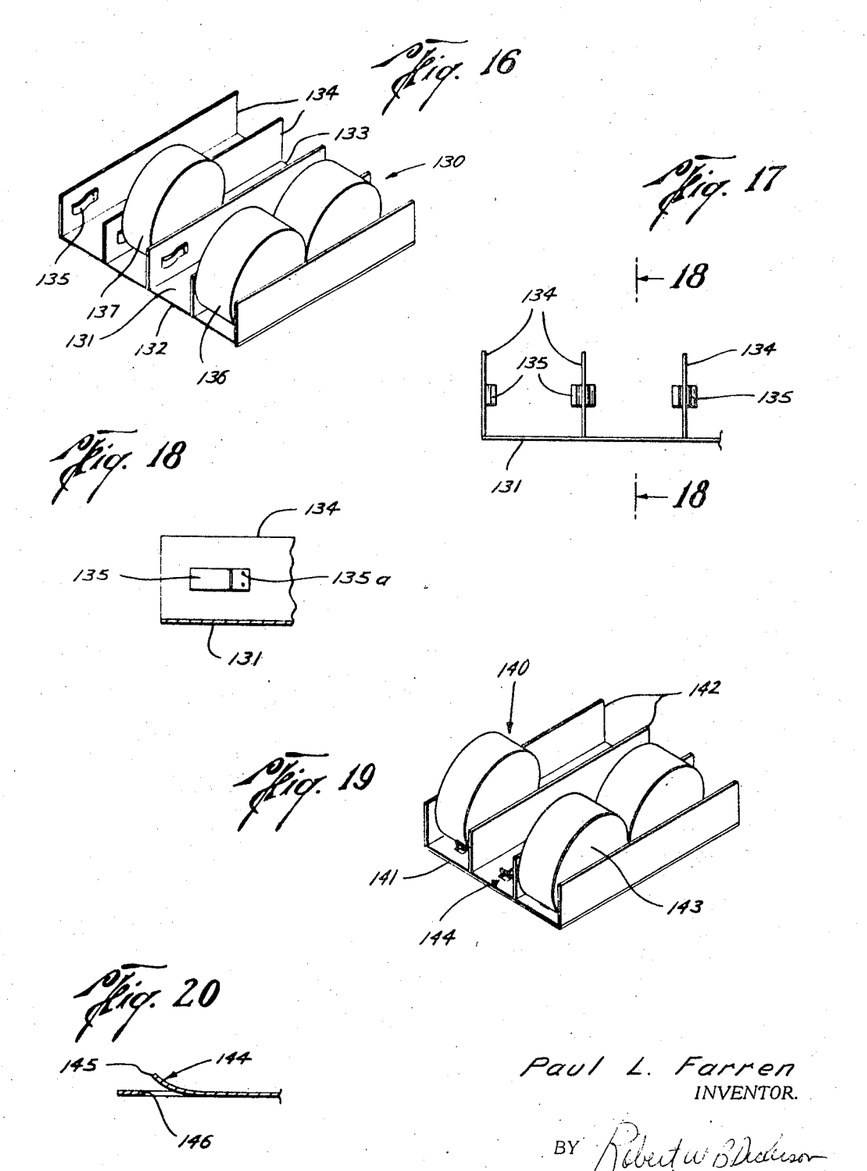
FIGURE 16 is a perspective of a further modified tray.
FIGURE 17 is a front elevation, parts being broken away of the tray of FIGURE 16.
FIGURE 18 is a section taken along lines 18—18 of FIGURE 17.
FIGURE 19 is a broken perspective of a further modified tray.
FIGURE 20 is a section of the leaf spring of FIGURE 19.
Figures 21, 23, 24, 25:
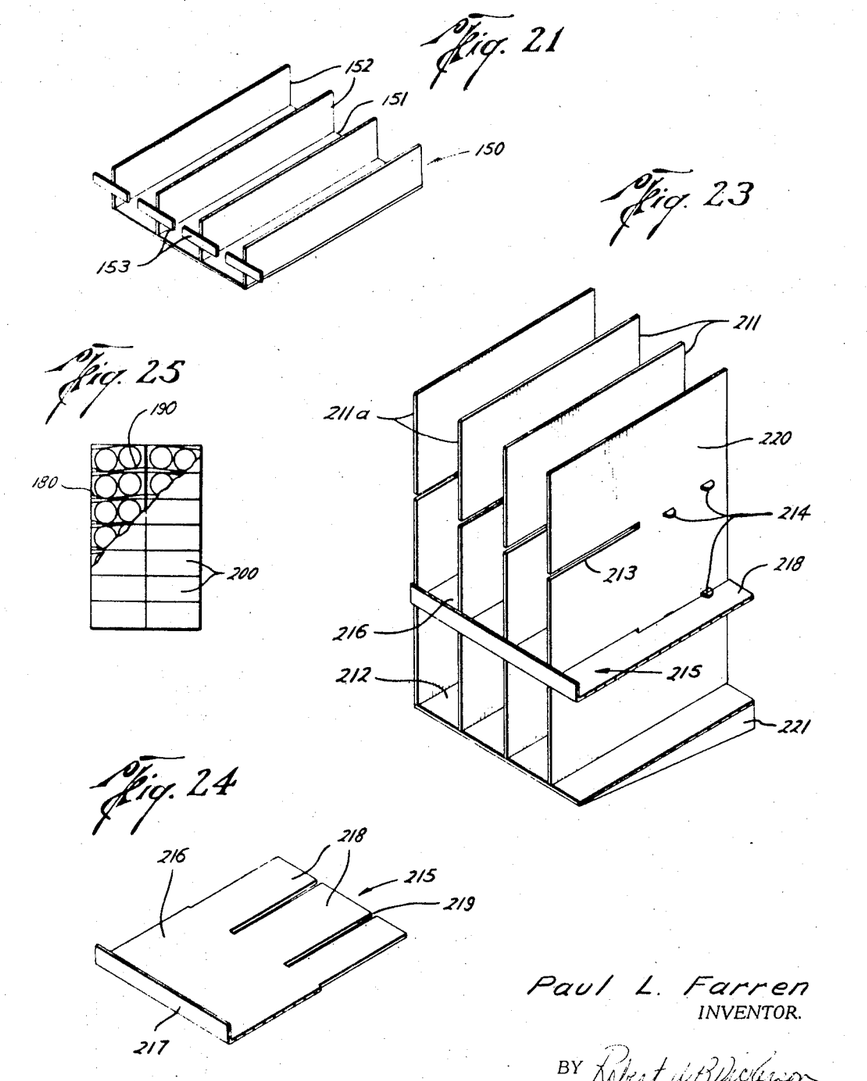
FIGURE 21 is a broken perspective of a further modified tray.
FIGURE 23 is a perspective of a honeycomb assembly.
FIGURE 24 is a perspective of the shelf of FIGURE 23.
FIGURE 25 is a partly broken elevation of a stacked group of the containers shown in FIGURE 22.

FIGURES 19, 20 and 21 depict means for limiting forward motion of a reel in the absence of a lip on the tray itself or on the superstructure or in the absence of providing separate limiting means such as the adapter 44 of FIGURE 4. The tray, indicated generally as 140 in FIGURE 19, has a bottom 141, said bottom being divided into a plurality of runways or compartments by spaced dividers 142. Intermediate said dividers, means are provided for yieldably barring forwardly motion of a reel, such as reel 143. Said barrier means includes punched out tongue 144. Assuming that bottom 141 is fabricated of metal, tongues 144 could be punched during fabrication so that forward edge 145 is bent upwardly, leaving cutout 146 in bottom 141, so as to require pressure additional to the weight of the stored reel to depress said tongue. When plural reels are present, tongue 144 would be completely depressed and the foremost reel wedged between said tongue and an upper surface such as a shelf. On the front reel being removed, tongue 144 would act as an indent, and restrain the previously rearwardly reel in an intermediate position.

Butterfly wings 153, which could be of rubber, or even metal hinges, would be provided to the forward edge of upright dividers 152, said dividers being spacedly provided bottom 151, of shelf 150 as seen in FIGURE 21, so as to provide alternate motion limiting means to that shown in FIGURES 19 and 20.

In addition to providing a framework or skeleton on which shelves may be placed or affixed, as previously described herein, this invention contemplates an individual unit or module which may be economically fabricated to store a limited number of data containers. Such modules may be accumulated, stacked and placed as needed, thus being adapted to the needs of the user, regardless of the size of such needs.

Figure 22:
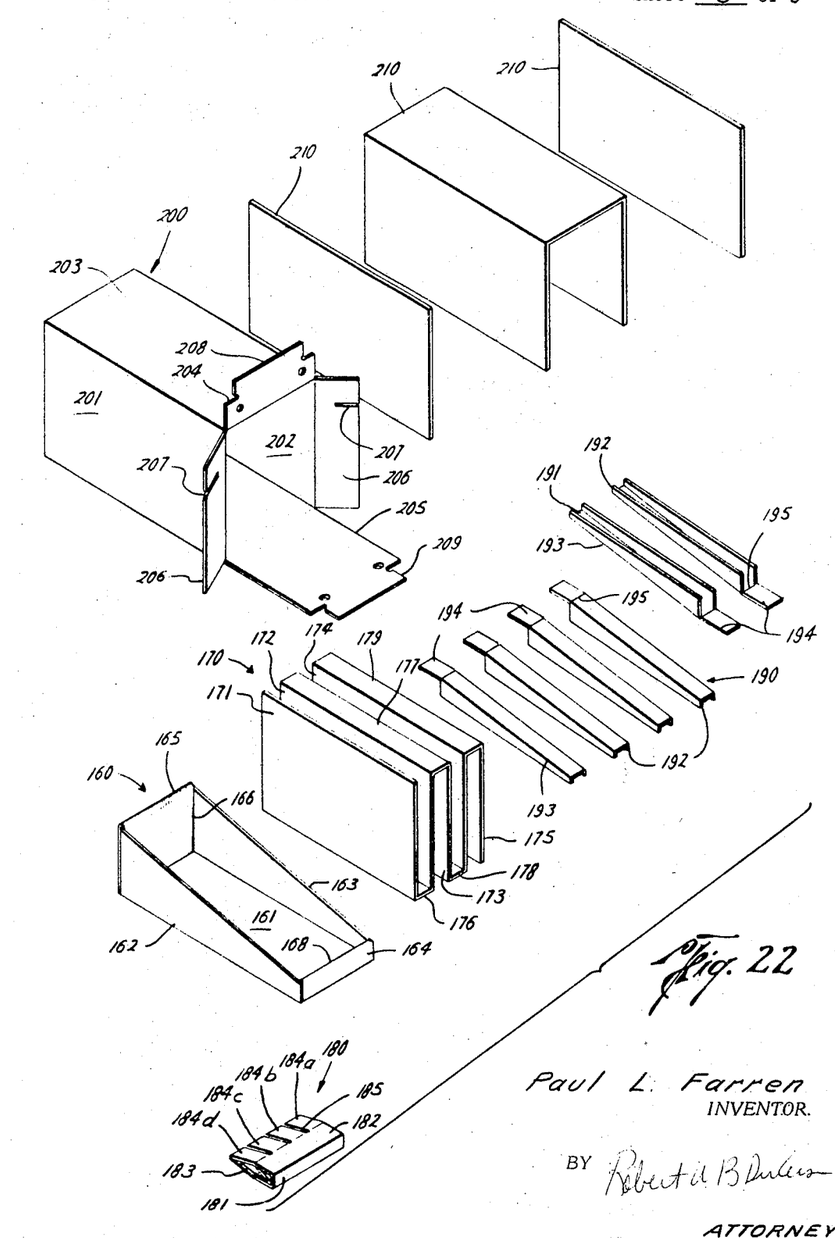
FIGURE 22 is an exploded perspective of a box assembly.

The exploded view of FIGURE 22 depicts the elements required to make such a complete transportable module. Moving from left to right of the figure, number 160 indicates a tray-like container having bottom 161, sides 162, 163, front 164 and rear 165. Said rear portion 165 is seen to be greater in height than front 164, causing sides 162, 163 to taper so as to be higher adjacent their juncture with the rear member, along line 166, for example, than with front panel 164, along line 167, for example.

Divider 170 is an originally flat sheet, bent so as to form a series of spaced vertical walls 171, 172, 173, 174 and 175 respectively. Walls 171 and 172 are linked by floor portion 176; members 172 and 173 by ceiling 177; members 173 and 174 by floor 178; and members 174 and 175 by ceiling portion 179. This tortuous assembly is adapted to be inserted within tray 160 forming a series of channels for containing a group of data containers, for example tape rolls.

Slotted positioning member 180 is trapezoidal in configuration and is positioned within the confines of tray 160, opposite to the relation shown in FIGURE 22. Upright wall 181 would rest adjacent front panel 164, the two pieces being of approximately equal heights, so that the flat upper surface 182 of member 180 would present a substantial continuation of the upper surface 168 of front 164. Said flat upper surface 182 is seen to bend angularly so as to present an inclined surface at its juncture with bottom 183, said inclined surface being divided into a plurality of fingers 184a, 184b, 184c, and 184d, by a series of aligned slots 185. Thus, on assembly, said slots would face the rear wall 185, of tray 160. The length of divider member 170 is slightly less than that of tray 160 so on inserting said divider fully to the rear of said tray, positioning member 180 may also be inserted toward the front of said tray with the forward edge of upright walls 172, 173, 174 nesting within the confines of slots 185 and fingers 184a, 184b, 184c and 184d penetrating within the channels formed by said upright walls. Thus the inclined surface of positioning member 180, adjacent said slots would create a runway which would be a barrier to forwardly motion of any tapes that would be positioned intermediate said upright walls. It should be noted that outer walls 171, 175 of divider 170 would rest adjacent side walls 162, 163 of tray 160 and serve as additional reinforcing means.

Numeral 190 indicates a combined sealing and runway means. Actually, in the configuration shown in FIGURE 22, there could be eight of such members, as hereinafter explained. Each one would include a flat bottom 191 of slightly less width than that of horizontal walls 176, 177, 178 or 179. Rear deck 192 would be a vertical extension of said bottom 191 and would be joined to sides 193 and 194, as would said bottom 191 be joined to said sides. Flange 194 is joined to bottom 191, along line 195, said flange may pivot along said juncture at 195. It is seen that walls 193 and 194 are higher at their end adjacent line 195 than at their other end adjacent back 192. Thus when said member is inverted from the position shown in FIGURE 22, i.e., with bottom 191 being uppermost and said member resting with the edges of walls 193 and 194 atop a flat surface, then surface 191 will be inclined so as to present a runway. Four members, such as 190, would be inserted within the channels formed by the upright walls of divider 170, one within each of the channels. The finger grip tab 194 may be folded between walls 193, 194, the device inverted from that position shown in FIGURE 22 so that rear 192 would rest adjacent the juncture of fingers 184a, 184b, 184c and 184d with bottom 183 of member 180, and surface 191 of runway 190 would tend to cause a tape roll resting thereon to move toward the front of tray 160. In the event of contemplated long usage a rectangular metal strip (not shown) conforming to the dimensions of surface 191 could be placed on top of said surface. Thus the side discs of stored tapes would not wear grooves in said surface. Another group of four members 190 would be placed atop tape rolls that may be placed within the chambers defined by the walls of divider 170, in the position of member 190 shown in FIGURE 22, i.e., with the tab 194 facing forwardly. Sides 193 and 194 would wedge between the top of said tape rolls and ceiling members 177 and 179, or the upper surface of container 300 intermediate said ceiling members, so as to securely position said tape rolls. This is especially helpful during any necessary transportation. Further, in this position, tabs 194 are easily grasped so as to permit access to any tapes contained within.

Thus, on assembly, divider 170 would be placed within tray 160. Member 180 would have its slotted inclined surface mesh with the forward surface of the upright walls of divider 170, and bottom 183 rest atop bottom wall 161. Runways 190 would be inserted within each of the chambers intermediate the upright walls of divider 170 so that the floor presented by surface 191 of each of the runways would decline from the rear of tray 160 toward slotted member 180, with any tapes contained within said chambers tending to rest adjacent the inclined surface of fingers 184. Of course on removing one tape from a chamber, any tapes behind said one tape would roll toward the front of the tray so as to be readily accessible. The entire assembly of members 160, 170, 180 and 190 may then be inserted within outer container 200 for storage and/or shipment. Said container 200 includes sides 201, 202, top 203, a rear (not shown) upper front cover 204, lower front cover 205, and side covers 206. Said side covers 206 include slots 207 into which may be inserted tabs 208 and 209 of said upper and lower front covers respectively, for sealing purposes. Packing and reinforcing 210 may be inserted within container 200 if needed. On inserting said tray within said outer container, members 190 may be inserted atop any tape rolls to securely position said rolls. By virtue of the inclined surface on which the tape rolls ride a plurality of trays 160, with or without outer container 220, may be placed on a rack as an ultimate storage device. By utilizing outer container 200, such devices may be stacked atop each other with no damage to the tapes contained therein, and without the necessity for a storage rack assembly.

While it is felt that economy could best be served by fabricating the entire structure of FIGURE 22 of paper products, the simplicity of the structure would lend itself to fabrication, as by molding, from numerous plastic materials, wood or metal, depending on the intended use.

It is obviously within the contemplation of this invention rather than use runway members 190 to tend to cause tape reels to move forwardly, lower surface 161 of tray 160 could be caused to slope downwardly toward front 164, having the same effect. Or, shelf means such as member 120 of FIGURE 14 might be inserted within tray 160, atop tilted members 190, and in place of divider 170 and positioning member 180 giving the same effect of partitioned chambers for inserting reels. This construction would also permit the shelf to be removed and placed in position on superstructure within the user's establishment.

By modular construction such as described, the tiltable shelf components can be stacked, as shown in FIGURE 25, and the need for other supporting structures or shelves may be eliminated. The modules then form a self-erecting storage library completely functional and sufficient within themselves. Seven or more of such units can be stacked atop each other to make the equivalent of a single pre-constructed rack, and these can be so arranged in a room to form a complete library. Manufacturers can index and inventory the reels or other materials, ship them in their self-erecting modules, and save the user the cost of racks and inventorying. These modules can also be stacked and mounted on mobile means to present further space-saving structures as shown in FIGURE 3.

Considering now the embodiment of FIGURES 23 and 24, a honeycomb module is shown. A plurality of upright plates 211 may be affixed at their lower end to flat bottom 212, in any standard manner. Said plates possess spaced and aligned slots 213, and as a rearward continuation thereof, aligned punched-out ears 214. Inserts 215 comprise body portion 216 having at one end thereof, upturned flange 217, the other end being broken into a plurality of fingers 218 by virtue of parallel slots 219. These slots 219 may mesh with slots 213 in plates 211 to permit inserts to form shelves therebetween. Slots 213 may incline slightly upwardly moving from front edge 211a of plates 211 toward their rear edge and ears 214 may be aligned with said slots 213 to form a continuously inclined track for inserts 215, in order that said inserts may form tilted shelves on insertion, thus permitting any tape rolls stored on said shelves to tend to roll forwardly until limited by flange 217. Should it be desired, in place of flange 217, a wedge member similar to member 180 of FIGURE 22 could be substituted therefor. Also if it were desired, in place of inclining slots 213 and aligned ears 214, they could be made substantially horizontally aligned and a simple wedge member 221 inserted under the entire assembly to tilt the shelves of the assembly in a forwardly direction. Obviously the wall and shelf assembly shown by FIGURES 23 and 24 could be expended to any desirable size, for example in a safe with a honeycomb of tiltable or tilted shelves, each containing several reels of material, all receivable from a single front position.

Throughout all of the embodiments of the invention depicted hereinabove, the concept of permitting greater use of limited storage space has been followed. Plural rollable or slidable containers, such as tape or film rolls, may be stored, rearwardly of one another. On withdrawal of the forwardlymost one of said containers, the rearward ones will tend to move to a more accessible position.

Thus, in summation, mechanisms have been designed wherein a large increase in the volume of stored data has been permitted within limited confines. Such mechanisms utilize the concept of tilting the individual shelves forwardly. By virtue of such tilting, reels may be positioned in depth within each shelf, instead of the standard back to back arrangement. On removing the most forwardly of the reels, the remaining ones will slide or roll into a more accessible position. Further, by providing a wheel and track assembly, the individual racks may be moved, thus providing a variably located aisle and a greatly increased storage capacity.

While a number of modifications and embodiments of the invention have been described, it should be obvious that numerous other modifications would be possible by one skilled in the art without departing from the spirit of the invention, the scope of which is intended to be limited only by the following appended claims.

I claim:
1. In a storage device, the combination of:
structural support means, including a pair of upright members,
shelf support means, said shelf support means including means linking said upright members, and further including a pair of oppositely disposed shelf positioning members, which positioning members are joined to the upright members so as to be positioned at least partially below said linking means, and
wherein said linking means is a channel shaped member and said shelf positioning members are U-shaped; and shelf means are provided which are mounted with one end lower than the other by said linking means and said shelf positioning members.

2. The device of claim 1 wherein said shelf means includes a plurality of compartment forming walls each being affixed to a base portion, said base portion having sloping ridges formed at opposite ends to permit said shelf means to be positioned with respect to said channel shaped member and said shelf positioning members.

3. A shelf for storing retrievable data including:
a base member;
a plurality of spaced compartment forming walls extending from said base member, said shelf being provided with means for limiting motion of reels that may be positioned thereon; and
wherein said motion limiting means includes ridges formed at opposite ends of said base member, said ridges formed also causing oppositely disposed cutaway portions to be formed on the undersurface of said base thereby permitting said shelf to be positioned astride structural support means.

4. A shelf for storing retrievable data including:
a base member;
a plurality of spaced compartment forming walls extending from said base member, said shelf being provided with means for limiting motion of reels that may be positioned thereon; and
wherein said motion limiting means includes compressible spring means affixed to said walls.

5. A shelf for storing retrievable data including:
a base member;
a plurality of spaced compartment forming walls extending from said base member, said shelf being provided with means for limiting motion of reels that may be positioned thereon; and
wherein said motion limiting means includes leaf spring means intermediate a pair of side walls, said leaf spring means being formed by punching out a portion of said base member.

6. A shelf for storing retrievable data including:
a base member;
a plurality of spaced compartment forming walls extending from said base member, said shelf being provided with means for limiting motion of reels that may be positioned thereon; and
wherein said motion limiting means includes yieldable tabs which are affixed to one end of said walls and which require sufficient force to be exerted to cause said tabs to yield as to effectively restrain reels of material stored intermediate said walls in the absence of outside pressure being exerted against said tabs.

References Cited

UNITED STATES PATENTS

| | | | |
|---|---|---|---|
| 469,981 | 1/1892 | Sauerston | 229—42 |
| 1,913,655 | 6/1933 | Benoit | 229—42 |
| 2,915,193 | 12/1959 | Bromberg | 211—135 |
| 2,982,423 | 5/1961 | Handler et al. | 211—126 |
| 3,126,101 | 3/1964 | Katterjohn | 211—176 |
| 3,151,576 | 10/1964 | Patterson | 108—2 |
| 3,232,442 | 2/1966 | Wilson | 211—133 |
| 3,258,128 | 6/1966 | McPherson | 211—133 |
| 2,649,348 | 8/1953 | Calhoun et al. | 206—44.12 |

CHANCELLOR E. HARRIS, *Primary Examiner.*

U.S. Cl. X.R.

211—177